F. WOIDICH.
PROCESS AND APPARATUS FOR WOOD DISTILLATION.
APPLICATION FILED OCT. 8, 1912.

1,092,620.

Patented Apr. 7, 1914.

2 SHEETS—SHEET 1.

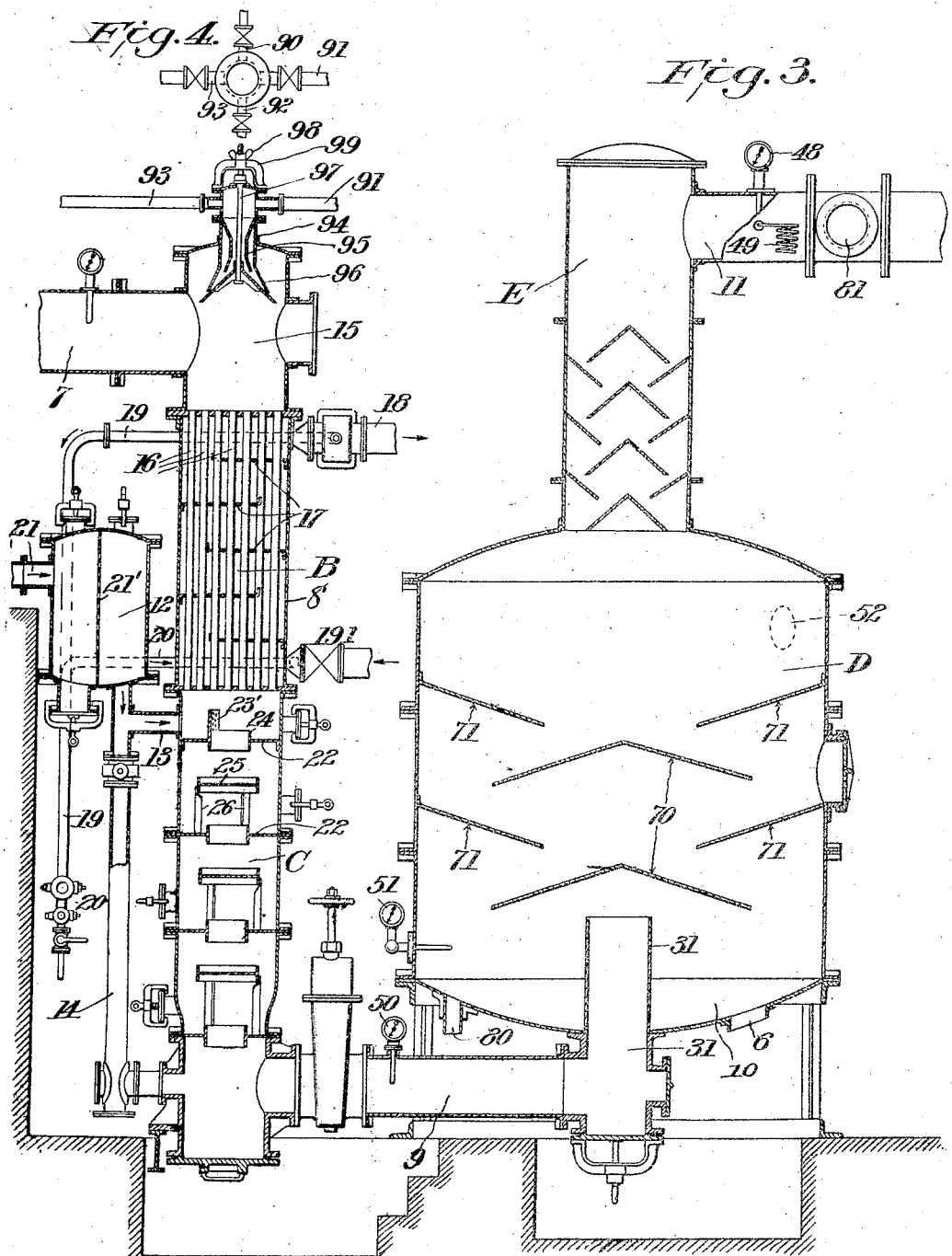

UNITED STATES PATENT OFFICE.

FRANZ WOIDICH, OF PRAGUE-WEINBERGE, AUSTRIA-HUNGARY.

PROCESS AND APPARATUS FOR WOOD DISTILLATION.

1,092,620. Specification of Letters Patent. Patented Apr. 7, 1914.

Application filed October 8, 1912. Serial No. 724,584.

*To all whom it may concern:*

Be it known that I, FRANZ WOIDICH, a subject of the Emperor of Austria-Hungary, residing at Prague-Weinberge, Austria-Hungary, have invented certain new and useful Improvements in Processes and Apparatus for Wood Distillation, of which the following is a specification.

My invention relates to a process of and apparatus for separating from the gases and vapors produced in the destructive distillation of wood and like organic materials, the tar and oily constituents of such vapor, and has for its object to so completely separate from such gases and vapors, the tar and oily constituents that the other products, such as acetic acid, wood alcohol, etc., may be successively recovered free from contamination by tar or oils, these products being thus directly produced in a state of commercial purity.

In the destructive distillation of wood, the gases and vapors are not produced at a uniform rate and the composition of such gases and vapors varies during the progress of the distillation. Owing to these variations in volume and composition, the cooling of the current of mixed gases and vapors to a temperature sufficient to condense the tar does not insure a clean separation between the tar and oils on the one hand, and the acid vapors on the other. The tar, thus separated, retains a greater or less percent. of acetic acid; and the acid vapors carry along tarry and oily constituents which contaminate the products, such as acetic acid and wood alcohol, condensed from such vapors. Wood tar, as is well known, contains heavy and light oils, the heavier oils having a higher boiling point than the lighter oils (see *Industrial Chemistry*, Rogers and Aubert, pages 540, 541). It is these oils of lower boiling point which are most likely to escape condensation, and it is the object of my invention to provide a process whereby this difficulty is obviated, and whereby there may be effected the complete separation from the distillation gases of the tars and oils commercially free from acid, as well as a direct and continuous production of commercially good qualities of acetate (gray acetate of lime exceeding 80 per cent.) and wood alcohol, at any stage of the wood distillation process.

Figure 1:
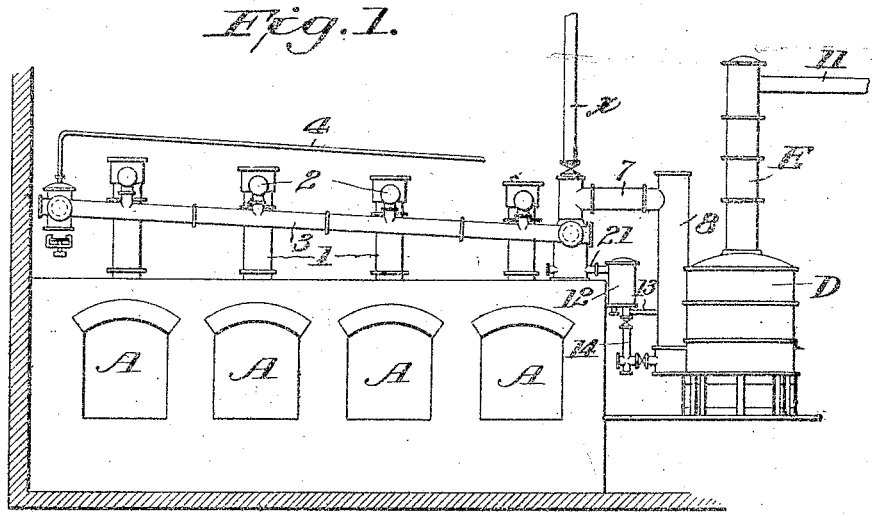
Figure 2:
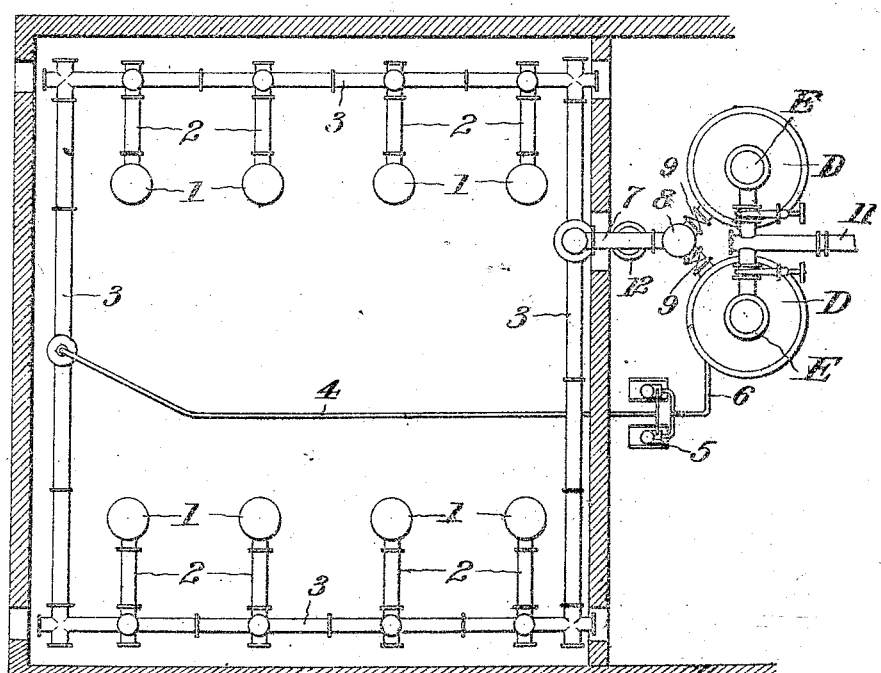

Referring to the drawings, Figure 1 is an elevation of the plant; Fig. 2 is a plan of Fig. 1; Fig. 3 is a section of the tar purification portion of the plant; and Fig. 4 is a plan of the mixing head and its connections.

Referring to Figs. 1 and 2, A, A, A, A, are a series of wood distilling ovens from which the distillation gases and vapors pass through pipes 1, 2, into a collecting main 3. The ends of the pipes 2 open into the main 3 to permit the distillation gases to flow over the tar in the main.

4 is a pipe through which tar is delivered into the main 3 from a pump 5, connected by pipe 6 to the tar separator. The gases pass through the pipe 7 into the top of the column 8, thence through one of pipes 9 into the tar separator D (two being shown for alternate or simultaneous use) from which the tar-freed gases are delivered to pipe 11, and thence through the apparatus for recovering acetic acid, wood alcohol, etc., to a suction pump (not shown) from which the waste gases are delivered either directly or through the heat interchanger (to be later described) to the combustion furnaces for heating the wood-distilling retorts.

The tar, deliverd from pipe 4 into the main 3, as well as that which separates from the distillation gases, flows downwardly in the main 3, from which it is delivered into the tar collector 12, and thence through pipe 13 into the column 8. By an additional valved pipe 14, the tar may be delivered into the bottom of the column 8, for a purpose to be later referred to.

X is a valved pipe to permit exhaust of vapors directly to the outer air in case of necessity.

Referring now to Figs. 3 and 4, it will be noted that the delivery pipe 7 leads into a mixing-head 15, at the top of the column 8. Below this mixing-head 15, is arranged a heat-interchanger B, which may be of any suitable construction. As shown, it consists of a series of tubes 16, through which the distillation gases pass, the tubes passing through a series of staggered partitions 17. A cooling fluid surrounds the pipes, either cool waste gases or water being used. The cool waste gases are admitted into the bottom of the heat interchanger B through pipe 19¹ and exhausted at the top through pipe 18. If water is used as the cooling agent, it is admitted through pipe 20 at the bottom of the heat interchanger B and exhausted at the top through pipe 19. If waste gases are used, they are heated and then burned to heat the retorts. Below the heat-interchanger B is arranged a "cataract", for intimately mixing the distillation gases with tar, the cataract being designated as a whole by the letter C.

The tar from the collecting main 3 flows through pipe 21 into the tar-collector 12, which is provided with a transverse screen or filter 21', to separate out any solid materials such as coke, etc. The tar entering the column through pipe 13, flows onto the upper one of a series of perforated plates 22. Each of these plates 22 has a dam 24 around the perforation, and the dam 24 of the uppermost plate has a perforated upward extension or screen 23', opposite the opening of the pipe 13, to prevent an unequal flow of tar through the perforation. The tar rises and flows through the holes in the screen 23' and over the edge of the dam 24, and falls onto a plate 25, supported on legs 26, thence splashes over onto the next plate 22, and is thus brought into a finely-divided condition, while all the time in intimate contact with the downwardly flowing current of distillation gases. Other forms of "cataract" device may, of course, be used. From the bottom of the cataract, the mixed gases and vapors, now carrying a mist of tar-particles, pass through pipes 9 and 31, into the main tar separator D.

Any suitable form of tar separator may be used. As shown there are provided a series of centrally arranged inclined plates 70, 70, and annular inclined plates 71. The incoming stream of mixed gases carrying the tarry particles strikes the first plate 70, and then expanding laterally against the side of the vessel, is compelled to pass under the plate 71, upwardly against the plate 70, and so on, thereby being subjected to a series of impacts, expansions and contractions and abrupt changes of direction, whereby the tarry particles are separated out. The tar flows down the inclined plates and collects in the space at the bottom of the separator around the pipe 31. The pipe 6 delivers tar to the tar-pump, and the excess tar is withdrawn through the pipe 80. An auxiliary tar separator E provided with similarly arranged inclined shelves, may be arranged above the main separator to recover any residual tar particles.

The exit pipe 11 is provided with a thermometer 48, and a test-condenser 49. Other thermometers 50, 51, are provided at suitable points, and glass-covered peep-holes, such as 52 in the main separator D, and 81 in the exit pipe 11, enable the operator to observe the condition of the gases at various points in the apparatus.

In Fig. 4 and the upper left-hand portion of Fig. 3, a device is shown, at the top of the mixing head 15 for introducing fluids.

90, 91, 92 and 93 are valved pipes for water, cool permanent gases, steam and tar respectively. Within the upwardly extending pipe 94 is a nozzle 95, and a cone-shaped regulator 96, suspended on a rod 97. Its position may be adjusted by a nut 98 on the yoke 99. When an excess of distillation gases is produced in the ovens, it is necessary to dilute and cool the same, which is effected by introducing steam, water, or cool inert gases. It may also be necessary to introduce additional tar through the pipe 93, which is connected to the tar-pump, in case the quantity of tar delivered to the cataract, from the tar collector 12, is not sufficient to absorb the tarry vapors in the abnormal quantity of distillation gases.

The process is carried out as follows:—In starting the operation, when no tar is available, the distillation gases are passed through the heat-interchanger B, which is cooled to a point sufficient to condense as far as possible not only the tar but also the acid and water vapors, with a result that there is delivered into the tar-collecting space of the main separator 10, a highly acid tar mixture which is by the pump delivered into the collecting-main 3 where it is subjected to the highly heated gases coming from the wood distilling ovens. The acid and oily constituents of the tar are thereby evaporated and again delivered to the cooler and tar-collector until a sufficient quantity of tar has been collected to enable the apparatus to operate in the normal manner. After the plant has begun to operate in the normal way, tar of normal consistency is delivered by the tar-pump 5, through pipe 4, to the gas-collecting main 3, where it is, as above described, brought into intimate contact with the highly heated outgoing current of wood distillation gases, whereby there are vaporized from the tar the oily constituents, so that the distillation gases are completely saturated, under the existing temperature and pressure, with the oil vapors. The tar in its flow down the collecting main carries with it all solid material and thus prevents any clogging of this pipe. The saturated distillation gases are delivered into the mixing head 15, and thence into the cooler or regenerator B, where the gases are cooled approximately to the dew-point of the high-boiling-point vapors. It has been found that the vapors of the high-boiling-point ingredients, condensed or partly condensed to a mist or cloud, have a dissolving or absorbing action on the vapors of the lower-boiling-point oils, so that the tendency of the lower-boiling-point oils to separate from the mixture is greatly diminished. After passing through the cooler or recuperator B, the distillation gases, now containing a mist of oily and tarry vapors, are brought into intimate contact with the oil-freed tar which is delivered from the tar-separator 12, this mixture being effected in the cataract apparatus C, above described. This tar, which has been previously freed, by contact with the hot distillation gases, from practically all its volatile constituents, has been found to be particularly adapted to absorb all the oily and tarry constituents, whether vaporous or liquid, and to retain such constituents and especially those of low-boiling point, the vapors of which otherwise would escape with the acid vapors throughout the subsequent stages of the process. After passing through the cataract C, the mixture of the distillation gases, oil and tar globules and vapors, and mechanically entrained tar particles, is delivered through a pipe to the bottom of the main tar-separator D, in which and in the auxiliary separator, if used, the tar is, by the successive expansions, contractions, impacts, and changes of direction of the gas, completely separated. The mixed gases, now freed from tar, oil and oily vapors, are delivered to a connected series of apparatus in which the acetic acid, wood alcohol, etc., are continuously recovered in the usual way. The residual inert gases are delivered to the suction side of a pump (not shown), whence they may be forced, after passing through the recuperator, as above described, into the fire-boxes of the oven-heating apparatus.

In case the ovens should, for any reason, be overheated, and particularly at that stage of the distillation when the exothermic reactions begin, there may be evolved from the wood an abnormal quantity of very dense mixture of gases and vapors, from which the tar and oils would not be separated by the apparatus operating in the normal manner. I have accordingly provided at the top of the mixing-head, means for diluting and cooling this dense mixture to the desired consistency and temperature. This is effected by introducing into the gases wet steam, a spray of water or a current of cool waste gases. The effect of the introduction of these additions is to so dilute the dense mixture that its consistency becomes normal, and also to so cool it as to lower its temperature to the desired point, so that the partial condensation of the vapors of high-boiling-point oil and tar vapors is effected, as in the ordinary operation of the apparatus. In this case the cooler or recuperator acts most efficiently as a means for insuring a complete mixture of all the ingredients of the gas-mixture.

During the abnormal gas and vapor development additional tar may be supplied to the mixing-head through pipe 93 and the speed of the gas and vapor current is increased by accelerating the speed of the pump (not shown) which sucks the gases through the system.

The heat interchanger B may be cooled either by water, or preferably may be used as a recuperator for heating the permanent gases remaining after all condensable ingredients have been removed, these permanent gases thus being heated prior to their use as fuel for heating the ovens.

To enable the operator to control the operations of the apparatus, a test condenser 49 is provided beyond the auxiliary separator so that it can be ascertained by examination of the condensed liquid whether it is or is not free from oil. In the normal operation of the apparatus the thermometer 50 located in the tube at the bottom of the cataract should indicate about 150 to 160° C. If the temperature at this point is correct and there is still found to be an incomplete separation of the oil, it is necessary to cause the tar-pump to deliver additional tar to the collecting-main. By controlling the velocity of the gases and the quantity of tar delivered by the tar-pump, the exact operation of the apparatus can be readily maintained.

While I have shown a main tar-separator and an auxiliary tar-separator, it is not always in practice necessary to use both of these devices as either one alone may be sufficient.

It will be noted that my process is continuous in operation, i. e., there is a continuous treatment of the distillation gases in a series of apparatuses by which there is produced a tar commercially free from acids or other valuable volatilizable ingredients, and commercially tar-free acid gases suitable for direct recovery, without additional distillation or purification, of the acetic acid (gray acetate of lime exceeding 80 per cent.), wood-alcohol, etc., in a commercially pure condition. There is required, in the recovery of these commercial products, no additional heat, the heat remaining in the gases being sufficient to enable the well-known recovery-procedure to be effected.

I claim:

1. The process for the separation from the gases and vapors evolved during the destructive distillation of wood and other organic materials, of acid-free tar and tar-free acid vapors, which consists in bringing liquid tar into contact with the hot gases leaving the ovens whereby the oily constituents of the tar are vaporized and the hot gases saturated with oil vapors, separating the liquid tar from the gas current, lowering the temperature of the gases to the dew-point of the higher-boiling-point oily constituent, then again bringing into intimate contact the distillation gases and the tar from which the oily constituents had previously been removed, and then separating the tar from the gases.

2. The process of treating the gases and vapors evolved during wood distillation, which consists in saturating the hot gases with tar-oil vapors, lowering the temperature of the gases to the dew-point of the higher-boiling-point oil constituent, then bringing into intimate contact the thus treated gas with oil-free tar, whereby the tar absorbs or dissolves the oily constituents, and then separating the tar from the gases.

3. The process of treating the gases and vapors evolved during wood distillation, which consists in saturating the hot gases with tar-oil vapors, lowering the temperature of the gases to the dew-point of the higher-boiling-point oil constituent, then bringing into intimate contact the thus heated gas with oil-free tar, whereby the tar absorbs or dissolves the oily constituents, and then separating the tar from the gases by subjecting the mixed tar and gas to a succession of impacts, compressions, expansions, and abrupt changes of direction.

4. An apparatus comprising a wood-distilling oven, a collecting main for the gases evolved from such oven, means for delivering tar into said collecting main, a conduit connected to said collecting main and including therein a cooler, a cataract and a tar-separator, and a conduit for delivering tar from the collecting main to the cataract.

5. An apparatus comprising a wood-distilling oven, a collecting main for the gases evolved from such oven, means for delivering tar into said collecting main, a conduit connected to said collecting main and including therein a mixing head, a cooler, a cataract and a tar-separator, and a conduit for delivering tar from the collecting main to the cataract, and means for introducing fluids into said mixing head.

In testimony whereof I affix my signature in presence of two witnesses.

FRANZ WOIDICH.

Witnesses:
F. R. JUERGENSEN,
J. H. BRICKENSTEIN.